United States Patent [19]

Taguchi et al.

[11] Patent Number: 5,606,122
[45] Date of Patent: Feb. 25, 1997

[54] TIRE PNEUMATIC PRESSURE DETECTOR

[75] Inventors: Takeyasu Taguchi, Oobu; Toshiharu Naito, Okazaki; Nobuyoshi Onogi, Nagoya; Ikuo Hayashi; Yoshihiro Nishikawa, both of Okazaki, all of Japan

[73] Assignees: Nippondenso Co., Ltd., Kariya; Nippon Soken, Inc., Nishio, both of Japan

[21] Appl. No.: 525,205

[22] Filed: Sep. 8, 1995

[30] Foreign Application Priority Data

Sep. 9, 1994 [JP] Japan .................................. 6-241975

[51] Int. Cl.⁶ .......................... B60C 23/00; B60C 23/02
[52] U.S. Cl. ..................................... 73/146.2; 340/448
[58] Field of Search ..................... 73/146, 146.2, 73/146.5, 146.8; 340/445, 448, 442; 364/426.04, 576

[56] References Cited

U.S. PATENT DOCUMENTS 4,630,470 12/1986 Brooke et al. .................... 73/146.2
4,876,528 10/1989 Walker et al. .

FOREIGN PATENT DOCUMENTS

| | | |
|---|---|---|
| 578826 | 1/1994 | European Pat. Off. . |
| 636503 | 2/1995 | European Pat. Off. . |
| 4409816 | 9/1994 | Germany . |
| 4410941 | 10/1994 | Germany . |
| 62-149503 | 7/1987 | Japan . |
| 5133831 | 5/1993 | Japan . |
| 5221208 | 8/1993 | Japan . |
| 5294118 | 11/1993 | Japan . |
| 6328920 | 11/1994 | Japan . |
| 9114586 | 10/1991 | WIPO . |

*Primary Examiner*—Richard Chilcot
*Assistant Examiner*—William L. Oen
*Attorney, Agent, or Firm*—Cushman, Darby & Cushman IP Group of Pillsbury Madison & Sutro LLP

[57] ABSTRACT

Pickup coils which generate vehicle wheel speed signals which include vibration frequency components of tires during vehicle cruising are provided. An electronic control unit extracts resonance frequencies of tires from the vehicle wheel speed signals and estimates tire pneumatic pressure based on the extracted resonance frequencies. When an estimated vehicle wheel pneumatic pressure falls below a predetermined critical pneumatic pressure, pneumatic pressure decline warnings are generated and displayed by a display unit. An update switch is provided and when this update switch is turned on when replacing tires, the electronic control unit adjusts and sets the value of the critical pneumatic pressure described above based on the resonance frequency extracted during this time.

27 Claims, 12 Drawing Sheets

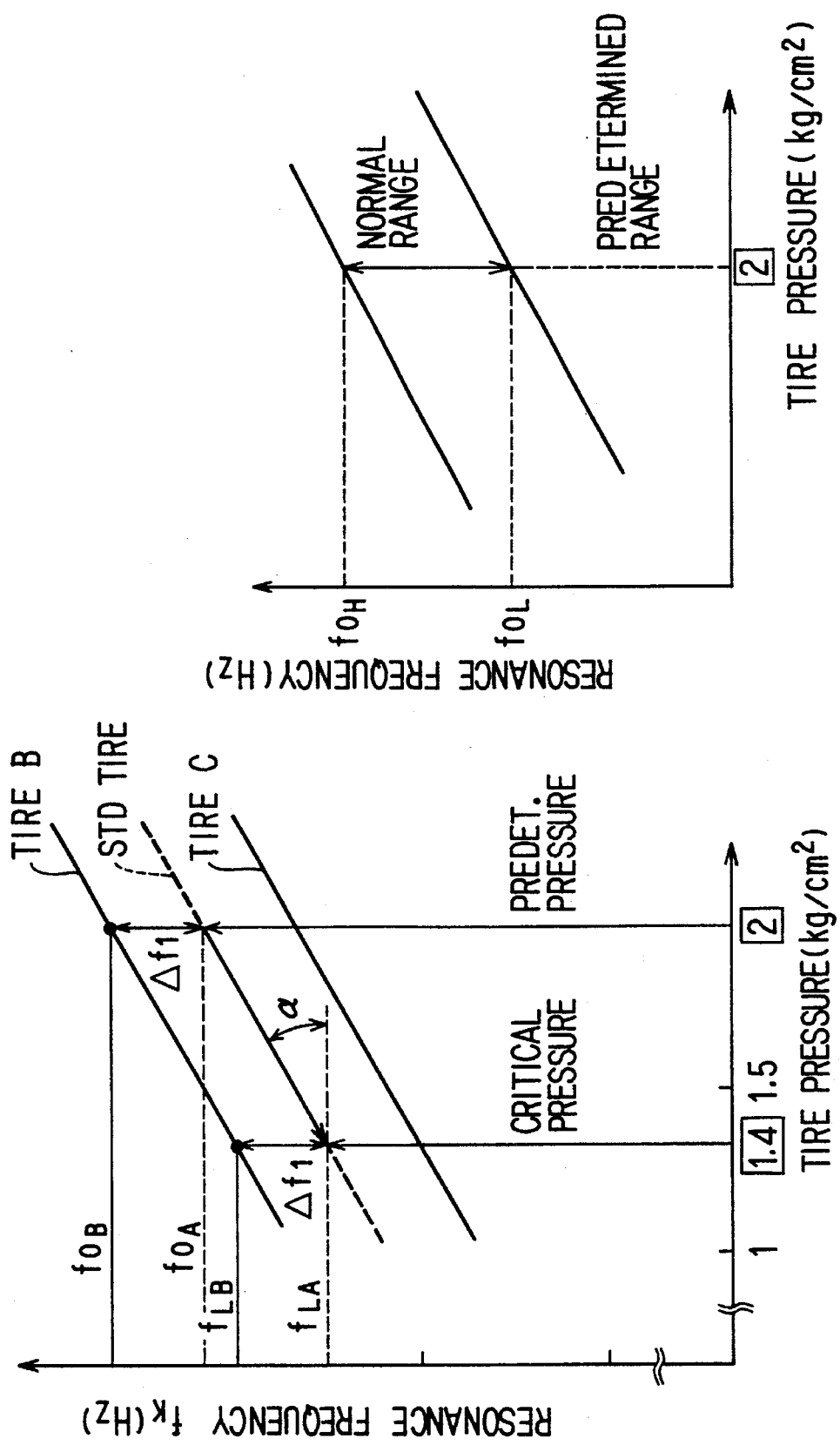

TIRE PNEUMATIC PRESSURE DETECTOR

CROSS-REFERENCE TO RELATED APPLICATION

This application is related to and claims priority from Japanese Patent Application Nos. Hei. 6-241975, the contents of which are hereby incorporated by reference.

BACKGROUND OF THE INVENTION

1. Field of the Invention

The present invention relates to a tire pneumatic pressure detector. More specifically, the present invention relates to a tire pneumatic pressure detector used for generating warnings or the like after detecting a decline in the tire pneumatic pressure.

2. Description of Related Art

Using the fact that tire radius changes according to pneumatic pressure, one known conventional method of detecting tire pneumatic pressure in real-time predicts tire pneumatic pressure by detecting different vehicle wheel speeds at the same vehicle speed. However, there are great differences in tire radii due to wear and tear, and tire radius is readily affected by such vehicle cruising states like turning or braking. Also, with radial tires or the like which have been in remarkably widespread use in recent years, the tire radius changes only by a minute amount, e.g., 1 mm, even if the pneumatic pressure decreases by 1 kg/cm$^2$, and thus, for this reason accurate prediction of the pneumatic pressure from the change in the tire radius is difficult.

Accordingly, focusing on the fact that spring vibration frequency components include tire resonance frequency (caused by tire torsion vibration and coupled vibration of the front and back springs of suspensions), the inventors have previously proposed an apparatus as disclosed in Japanese Laid-Open Patent Publication No. Hei 6-238920 which predicts tire pneumatic pressure from the resonance frequency or spring constant.

While the above proposed apparatus predicts tire pneumatic pressure more accurately than the conventional method based on tire radius, this method can be further improved.

There is room for improvement because the resonance frequency of the suspension system changes if the tires or wheels are replaced even for the same tire pneumatic pressure, and as a result, errors occur in the detection of pneumatic pressure and false warnings of abnormal pneumatic pressure are generated.

It must be noted here that abnormal pneumatic pressure refers to that state of tire pneumatic pressure that affects tire and vehicular functions such as contact of the tire with the ground, tire life, fuel consumption and the like.

SUMMARY OF THE INVENTION

In consideration of these problems, it is a goal of the present invention to provide a tire pneumatic pressure detector that is adaptable to all types and kinds of vehicle shapes and that can accurately predict tire pneumatic pressure even if tires or the like are replaced.

This goal is achieved in a first aspect of the present invention by providing a tire pneumatic pressure detector having a cruising signal generation unit which generates a cruising signal representative of motion of a vehicle wheel, an extraction unit which processes the cruising signal to extract a predetermined characteristic such as the wheel's resonance frequency or its tire spring constant and a tire pressure prediction section for predicting the tire's pneumatic pressure based on the resonance frequency or tire spring constant. The detector a tire change signal generator generating a tire change signal when the tire on the wheel is changed, a memory which stores a relationship between the predetermined characteristic (e.g., the tire resonance frequency or spring constant) and the tire's pneumatic pressure, a critical pressure computation section which computes a critical value of the resonance frequency or spring constant when the tire is changed, and a determination section for determining the tire pressure based on the critical value.

According to another aspect of the invention, the memory stores data indicative of a critical tire pressure corresponding to an abnormality (e.g., a low pressure condition) and a critical resonance frequency or spring constant corresponding thereto, as well as data indicative of a standard characteristic such as a standard resonance frequency or spring constant of a tire having a predetermined standard pressure. The data may be include a slope of a substantially linear relationship between the standard and critical characteristics, and the data may be indicative of different relationships for different types of tires.

In this case, the computation section computes a relationship between the extracted resonance frequency or spring constant and the standard resonance frequency or spring constant, and the system includes an alteration section which alters the critical resonance frequency or spring constant based on that relationship. An abnormality in the tire pressure may then be detected based on the altered frequency or spring constant.

According to another aspect, the computation section may calculate the deviation between the standard characteristic and the extracted characteristic, and the alteration section may alter the critical characteristic by adding the deviation to the critical characteristic. Also, the system may include an abnormality warning section which gives vehicle passengers a warning when the tire pressure is abnormal.

According to an additional aspect, the system may further include a conformity determination section which checks to see if the extracted characteristic after a tire change or the deviation between the extracted characteristic and the standard characteristic lies within a predetermined range of acceptable values, and a prohibition section which inhibits alteration of the critical characteristic, inhibits prediction of the tire pressure or inhibits generating a passenger warning signal when the extracted characteristic is outside that range.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 8 is a graph showing the relationship between resonance frequency and tire pneumatic pressure in the first embodiment;

FIG. 12 is an illustration of the relationship between resonance frequency and tire pneumatic pressure in the fourth embodiment.

DETAILED DESCRIPTION OF THE PRESENTLY PREFERRED EXEMPLARY EMBODIMENTS

Preferred embodiments of the present invention are described hereinafter with reference to the accompanying drawings.

Figure 1:
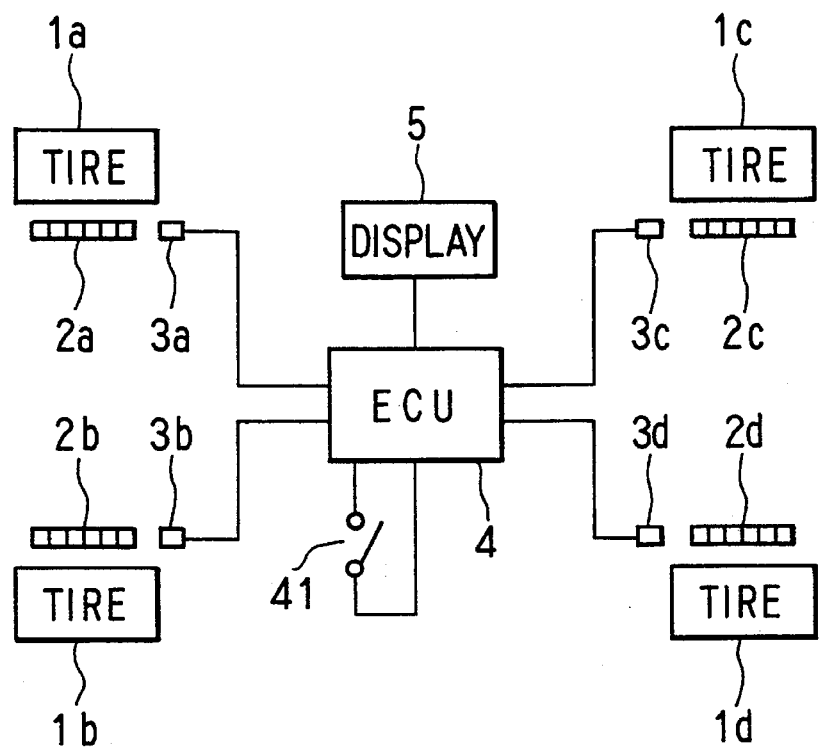
FIG. 1 is a block diagram showing the entire construction of a tire pneumatic pressure detector according to a first embodiment of the present invention.
Figure 4:
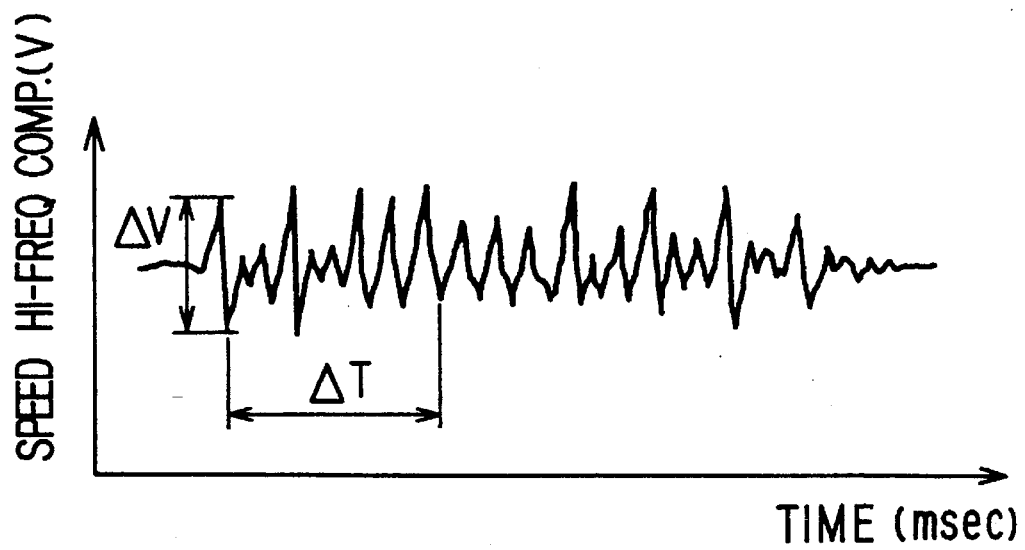
FIG. 4 is a graph of the waveform of high-frequency components of a vehicle wheel speed signal in the first embodiment.

As one example of an abnormal pneumatic pressure detecting system, the case when pneumatic pressure decline is detected and displayed is explained hereinafter. FIG. 1 shows the entire construction of the device with each of tires $1a$–$1d$ at the front, back, left and right of a vehicle being provided with pulsers $2a$–$2d$ that are integrated with the vehicle wheels. These pulsers $2a$–$2d$ are toothed wheels made of magnetic material. Pick-up coils $3a$–$3d$ are disposed at a predetermined distance from the outer circumference of each pulsers $2a$–$2d$. These pick-up coils $3a$–$3d$ are excited every time each tooth of pulsers $2a$–$2d$ passes by, in other words, each of pick-up coils $3a$–$3d$ generates a periodic alternating current signal in correspondence with the rotation speed of each of wheels $1a$–$1d$. This is shown in FIG. 4.

The output signal of each pick-up coils $3a$–$3d$ is provided to electronic control unit (ECU) 4. ECU 4 is constructed using a waveform shaping circuit, CPU, ROM and RAM, and following a processing program, ECU 4 performs signal processing to be explained later. ECU 4 is connected to display 5 and uses the display 5 to warn of the decline of tire pneumatic pressure as the result of the signal processing. In addition, ECU 4 is connected to update switch 41 which is entered during tire replacement or the like and which, as will be explained later, updates the critical frequency of the pneumatic pressure decline.

Figure 2A:
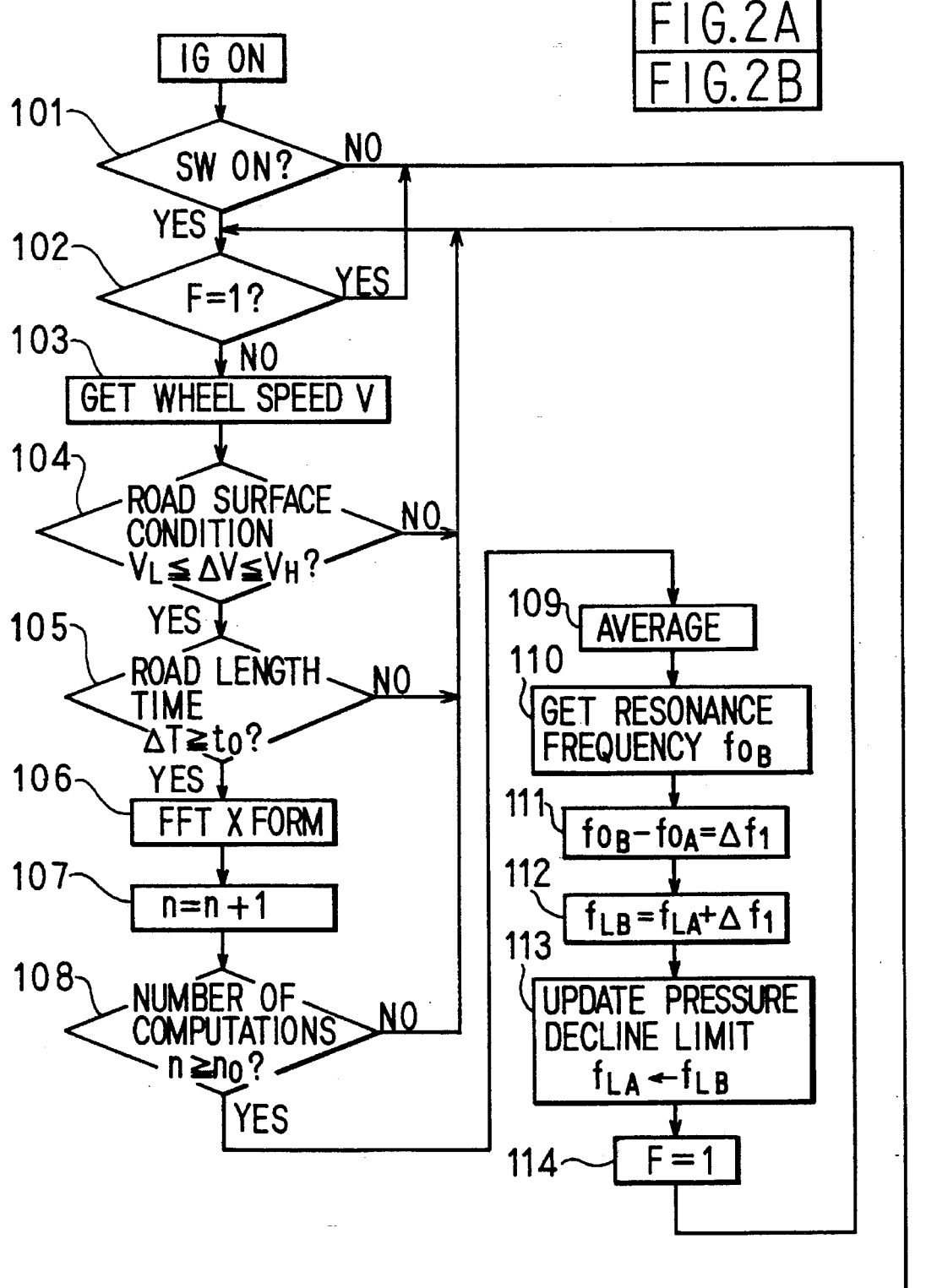
FIGS. 2A and 2B are a flowchart of the processing procedure of the electronic control unit according to the first embodiment.
Figure 2B:
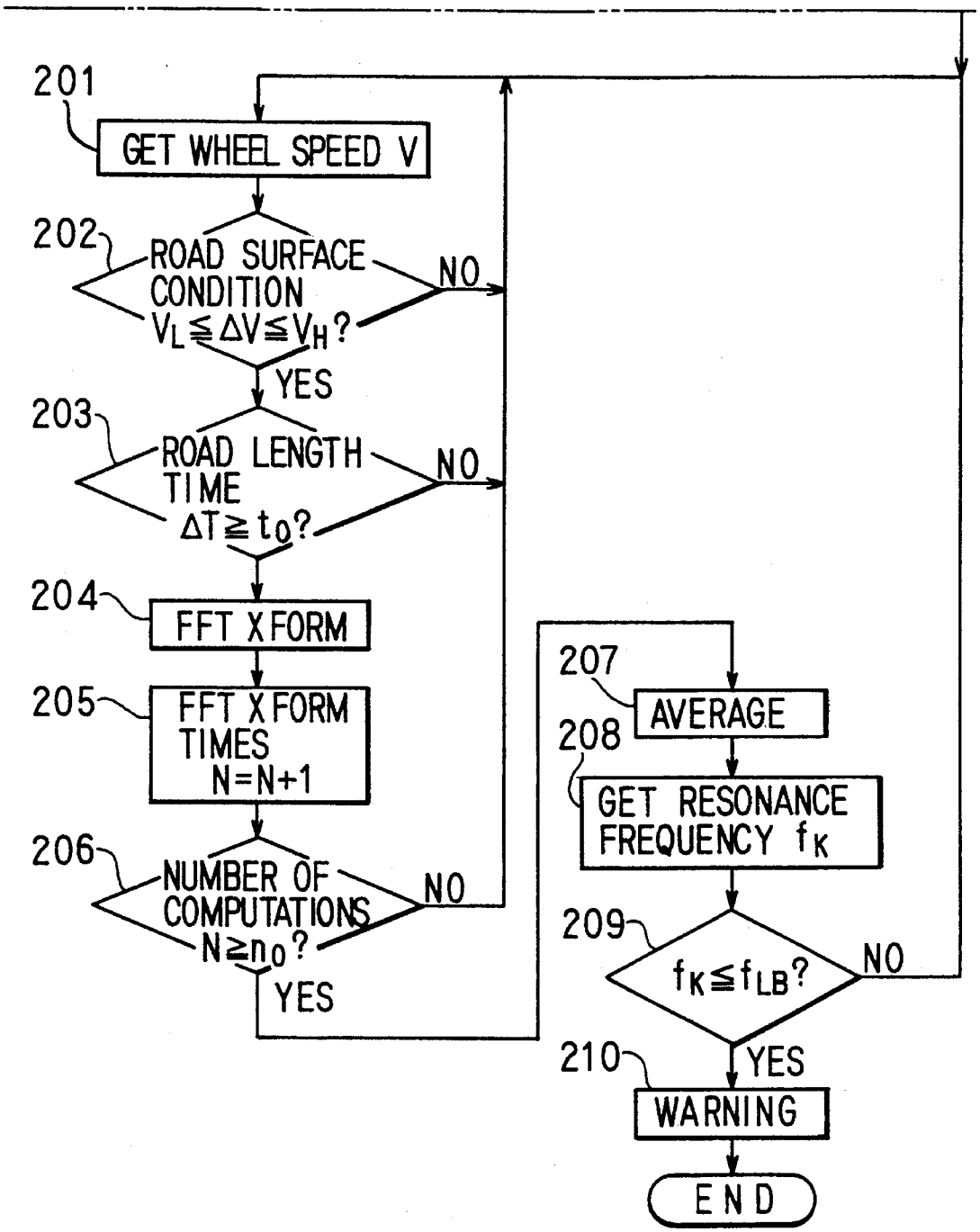
Figure 3:
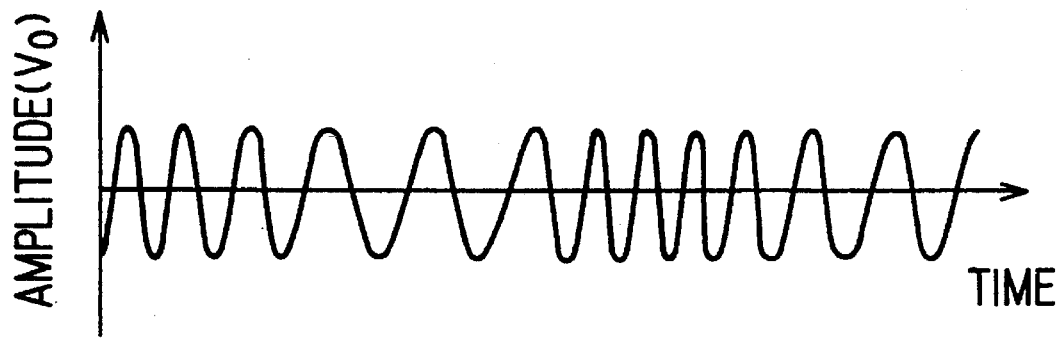
FIG. 3 is a graph of the output waveform of a pickup coil in the first embodiment.

FIGS. 2A and 2B show the signal processing procedure of ECU 4. Actually, the same process is performed for each of tires $1a$–$1d$ and therefore, the process for only one of the tires is explained. Step 101 checks if update switch 41 described above is switched on or not. Normally, switch 41 is not actuated and thus, control goes to step 201 and below of FIG. 2B. Also, update switch 41 which indicates tire replacement is actuated in step 101 when starting vehicles after factory shipment. Accordingly, control proceeds to steps 102 and 103 after starting the vehicle in step 101 and furthermore, a predetermined frequency $F_{OA}$ or critical frequency $f_{LA}$ for the standard tire stored in ECU 4 is retrieved in step 110 or the like and tire pneumatic pressure is determined in steps 111 to 113 with $f_{OA}=f_{OB}$, $\Delta f1=0$ and $f_{LB}=f_{LA}$.

In addition, the frequency computed at the start of driving during shipment can also be set as the predetermined frequency $f_{OA}$ Of the standard tire. It must be noted here that when replacing tires, the tire is pumped beforehand to a pneumatic pressure of the predetermined pressure (for example, 2 kg/cm$^2$).

Step 102 checks whether flag F is set. If flag F is not set, step 103 computes the vehicle wheel speed V. Vehicle wheel speed V is derived by dividing the interval between the tooth of the above pulsers $2a$–$2d$ by the time between pulses after wave-shaping the output signal of pick-up coils $3a$–$3d$ to form a pulse signal. This vehicle wheel speed V has high-frequency components that includes tire vibration frequency superimposed thereon, and the high frequency components $\Delta V$ are extracted through filtering. This is shown in FIG. 4.

Next, step 104 determines the surface road condition. This is for checking if the magnitude $\Delta V$ (shown in FIG. 4) of the high-frequency components of vehicle speed V is between standard values $V_L$ and $V_H$. The resonance frequency cannot be computed with high accuracy if $\Delta V$ is too large or too small. Step 105 checks to see if a time At since $\Delta V$ has satisfied the conditions of step 104 is at least as long as predetermined minimum road travel time $t_O$. Next, step 106 performs frequency analysis (for example, Fast Fourier Transformation (FFT) or Linear Predictive Method transformation) on the high frequency components extracted above. Hereinafter, the case when FFT calculations are used is explained.

Figure 5:
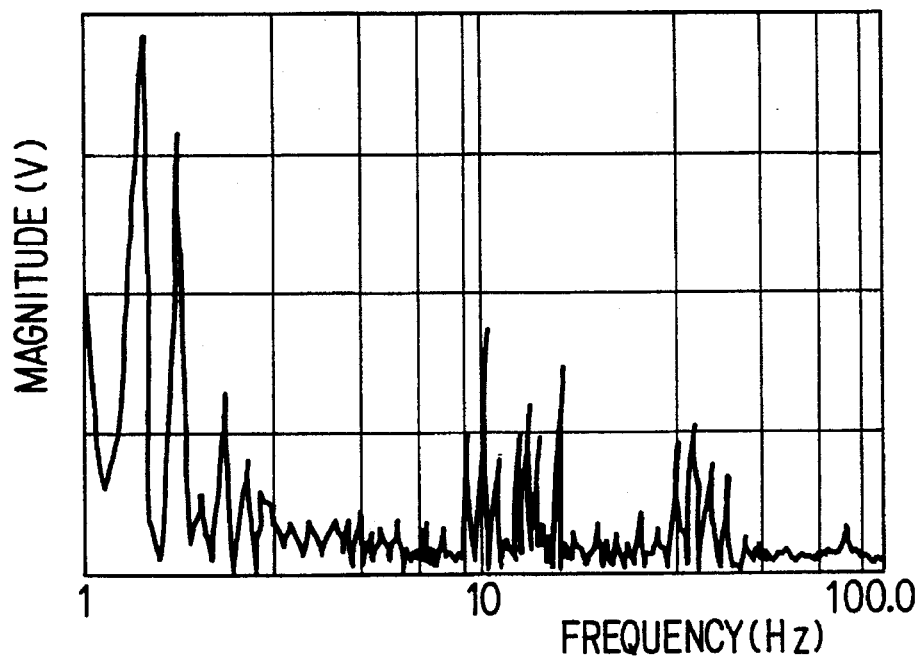
FIG. 5 is a graph showing the frequency spectrum of the high-frequency components of the vehicle wheel speed signal in the first embodiment.

FIG. 5 shows the random frequency characteristics caused by the effects of minute unevenness in the road that appears irregularly. In this way, in steps 107 and 108, FFT calculations are performed $n_O$ times to average out the fluctuations of the computation result of the FFT. Step 109 performs an averaging procedure. This process is shown in FIG. 6.

Figure 6:
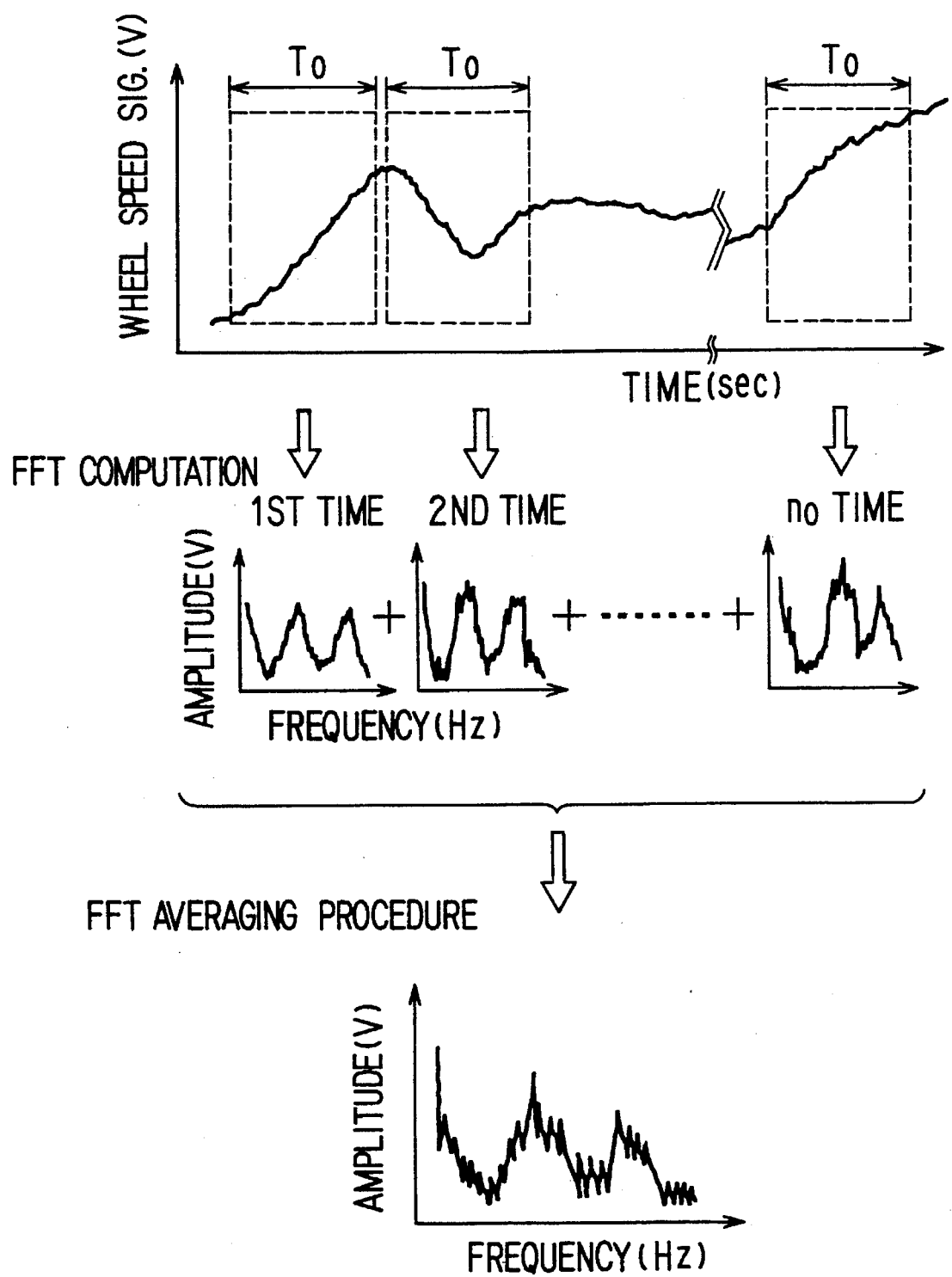
FIG. 6 is an illustration explaining the procedure of the averaging of the frequency analysis results in the first embodiment.

In FIG. 6, for every time interval $T_O$, FFT calculations are performed $n_O$ times (shown in the upper and middle rows of the figure) on the vehicle speed V derived during each interval, and performing averaging operations on the FFT computation results (lower row of the figure) to derive averages the gains of each frequency component and cancels the random noise fluctuation components which results in the resonance peak appearing clearly.

Figure 7:
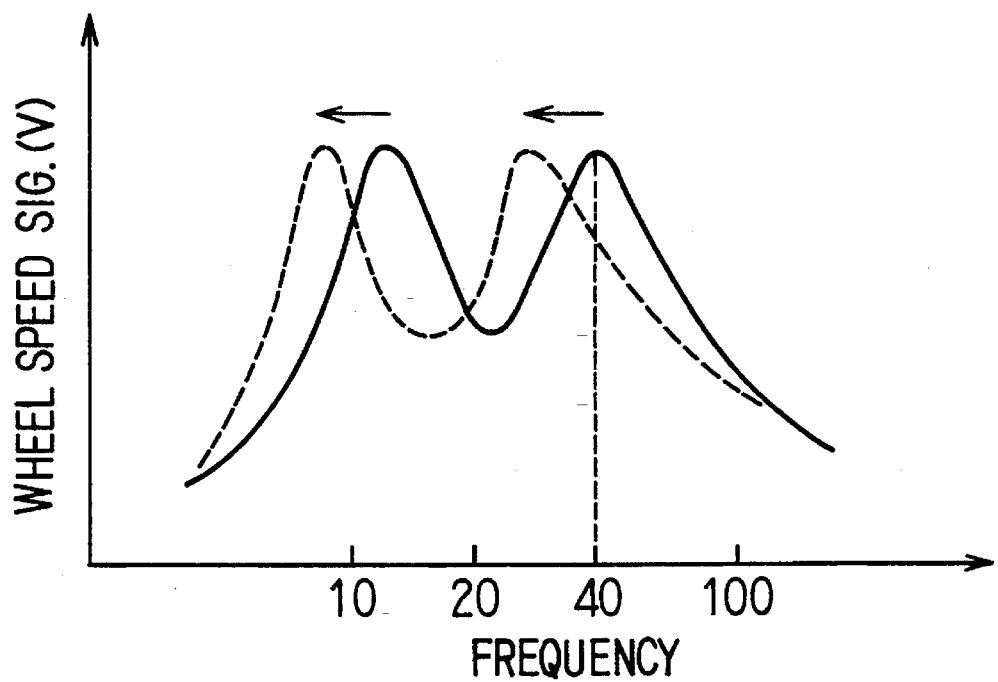
FIG. 7 is a graph showing the frequency spectrum of the high-frequency components of the vehicle wheel speed signal after moving averaging processing in the first embodiment.

The FFT computation result averaged in step 109, as shown in FIG. 7, has resonance peaks at two places along the frequency axis. As shown by the dotted line, when tire pneumatic pressure declines and the spring constant of the rubber part of the tire gets smaller, the resonance frequency also moves to the lower frequency side. It must be noted here that the above resonance frequency corresponds with the tire pneumatic pressure in principle.

After the averaging procedure of step 109, step 110 computes the resonance frequency $f_{OB}$. As shown in FIG. 8, this resonance frequency $f_{OB}$ is based on replacement tire B being supplied with the predetermined pressure. Compared to the standard tire, replacement tire B of the figure is a flattened and very stiff tire having a resonance frequency $f_{OB}$ higher than the resonance frequency $f_{OA}$ Of the standard tire.

According to the findings of the inventors, there is a range of allowable sizes for tires and wheels that can be installed on a particular vehicle type and within this range, as shown in FIG. 8, tire pneumatic pressure and resonance frequency can be translated in parallel while maintaining the slope α. It must be noted here that replacement tire C represents, for example, an aluminum wheel which replaced the iron wheel and comparing this tire with the standard tire, its resonance frequency is lower than that of the standard tire.

Meanwhile, from the fact that the slope which represents the relationship between resonance frequency and tire pneumatic pressure is constant for the same car type, step 111 computes the difference Δf1 between the resonance frequency when the tire is pumped to have the predetermined pressure (referred to as predetermined frequency hereinafter) $f_{OA}$, $f_{OB}$ during factory shipment or the like, and the following step 112 uses Eq. (1) to compute the new critical frequency $f_{LB}$. Step 113 then updates critical frequency $f_{LA}$ of the standard tire.

$$f_{LB}=f_{LA}+\Delta f1 \qquad (1)$$

It must be noted here that the above critical frequencies $f_{LA}$, $f_{LB}$ correspond to the critical pressure at which a warning of the decline of tire pneumatic pressure is generated, and are constant for the same vehicle type.

In addition, the critical frequency $f_{LA}$ for the standard tire and the resonance frequency $f_{OA}$ when the standard tire is pumped to have the predetermined pressure remain stored in ECU 4 or the like even after replacing the standard tire. For this case, computing a new critical frequency $f_{LC}$ when replacing the tire for the second time and thereafter involves the use of critical frequency $f_{LA}$ of the standard tire, the computation of a deviation Δf2 between a frequency $f_{OC}$ and a frequency $f_{OA}$, and the use of the Eq. (2) below.

$$f_{LC}=f_{LA}+\Delta f2 \qquad (2)$$

It must be noted here that when renewing the critical frequency using Eqs. (1) and (2), the standard tire is fixed and the predetermined frequency and critical frequency for the standard tire is the standard for computing the critical frequency for the replacement tire even if it is the second or subsequent tire replacement. In this way, the predetermined frequency and the critical frequency of the standard tire are stored, and with the use of this value to update the critical frequency which is the-determination standard of the pneumatic pressure of the new tire, there is no need to renew the standard used for updates and even after tire replacements are performed multiple times, tire pneumatic pressure detection remains accurate.

In addition, for the case when the predetermined frequency $f_{OA}$ and the critical frequency $f_{LA}$ for the standard tire is not stored after the first tire replacement, the new critical frequency $f_{LC}$ is computed as shown below. In other words, setting $f_{OC}$ as the frequency when a new tire is pumped to have the predetermined pressure, deviation Δf3 between frequency $f_{OC}$ and frequency $f_{OB}$ Of the presently-installed tire is-computed and critical frequency $f_{LC1}$ is computed using Eq. (3) shown below.

$$f_{LC1}=f_{LB}+\Delta f3 \qquad (3)$$

That is, when updating the critical frequency using the above Eq. (3), the standard for the frequency and the critical frequency in the next cycle is not fixed to that of the standard tire and is changed by the critical frequency and frequency of the tire after tire replacement. The same effect is derived with this kind of construction.

After executing the above procedure once, because step 113 updates critical frequency $f_{LA}$ of the standard tire to the critical frequency $f_{LB}$ of the tire after tire replacement together with step 114 setting flag F, tire pneumatic prediction is executed based on tire critical frequency $f_{LB}$ of the presently-installed tire in the succeeding cycles until tire replacement is performed, in other words, until the flag F is updated. In addition, even if update switch 41 is actuated after switching on the ignition switch, step 114 sets flag F and step 102 checks the condition of the flag; in other words, the value of the flag is checked, and thus, control proceeds to step 201 shown in FIG. 2B. Accordingly, the processes of step 103 and subsequent steps are performed only once after actuating the ignition switch.

The processes of steps 201–208 are the same as the processes of steps 103–110 of FIG. 2A. Step 209 compares the resonance frequency $f_k$ during vehicle cruising derived in step 208 with the new critical frequency $f_{LB}$ and if the former is smaller than the latter, step 210 generates a pneumatic pressure decline warning. Step 209 compares the initially set critical frequency $f_{LA}$ with resonance frequency $f_k$. In addition, also executed in step 209 are tire replacement and the sequential update of the critical frequency like $f_{LA} \rightarrow f_{LB} \rightarrow f_{LC}$ . . . after the end of each cycle after actuating update switch 41.

Meanwhile, it is possible to display the tire pneumatic pressure at all times for this embodiment. For this purpose, there is a need to store the relationship of tire pneumatic pressure with the resonance frequency as a map with map revisions performed using the above deviation of Δf1 derived for the replacement tire. Accordingly, the tire pneumatic pressure of the replacement tire can be predicted accurately with display 5 showing the predicted value.

While a pneumatic pressure decline warning is generated based on the critical frequency for the first embodiment, the pneumatic pressure decline warning can also be generated when the difference from the predetermined frequency exceeds a predetermined amount. The process for this case is shown in FIGS. 9A and 9B.

Figure 9A:
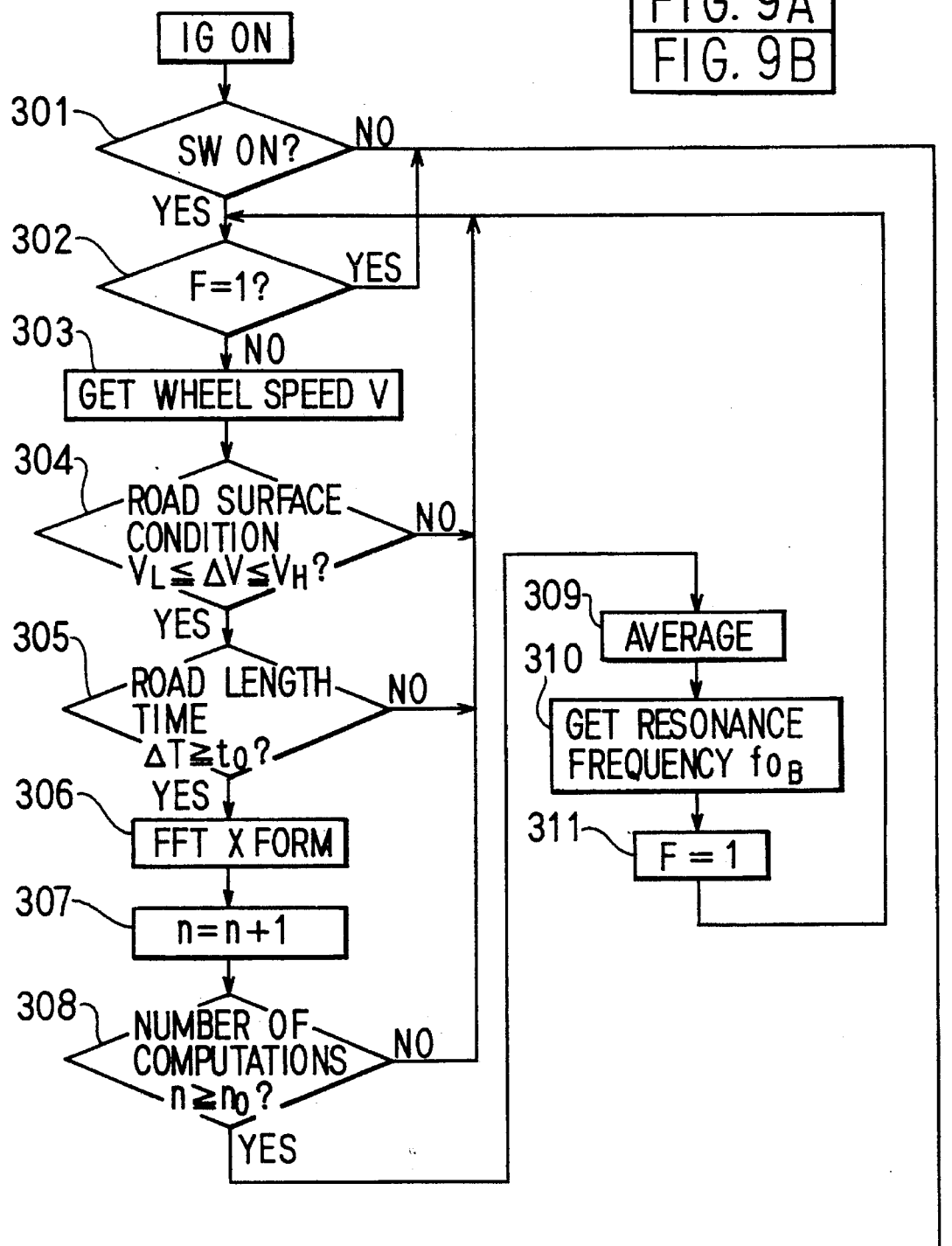
FIGS. 9A and 9B are a flowchart of the processing procedure of an electronic control unit according to a second embodiment of the present invention.

Steps 301–310 of FIG. 9A are the same as steps 101–110 of FIG. 2A of the first embodiment with the steps corresponding to steps 111–113 of the first embodiment omitted for this embodiment. Steps 401–408 of FIG. 9B are the same as steps 201–208 of FIG. 2B of the first embodiment.

Figure 9B:
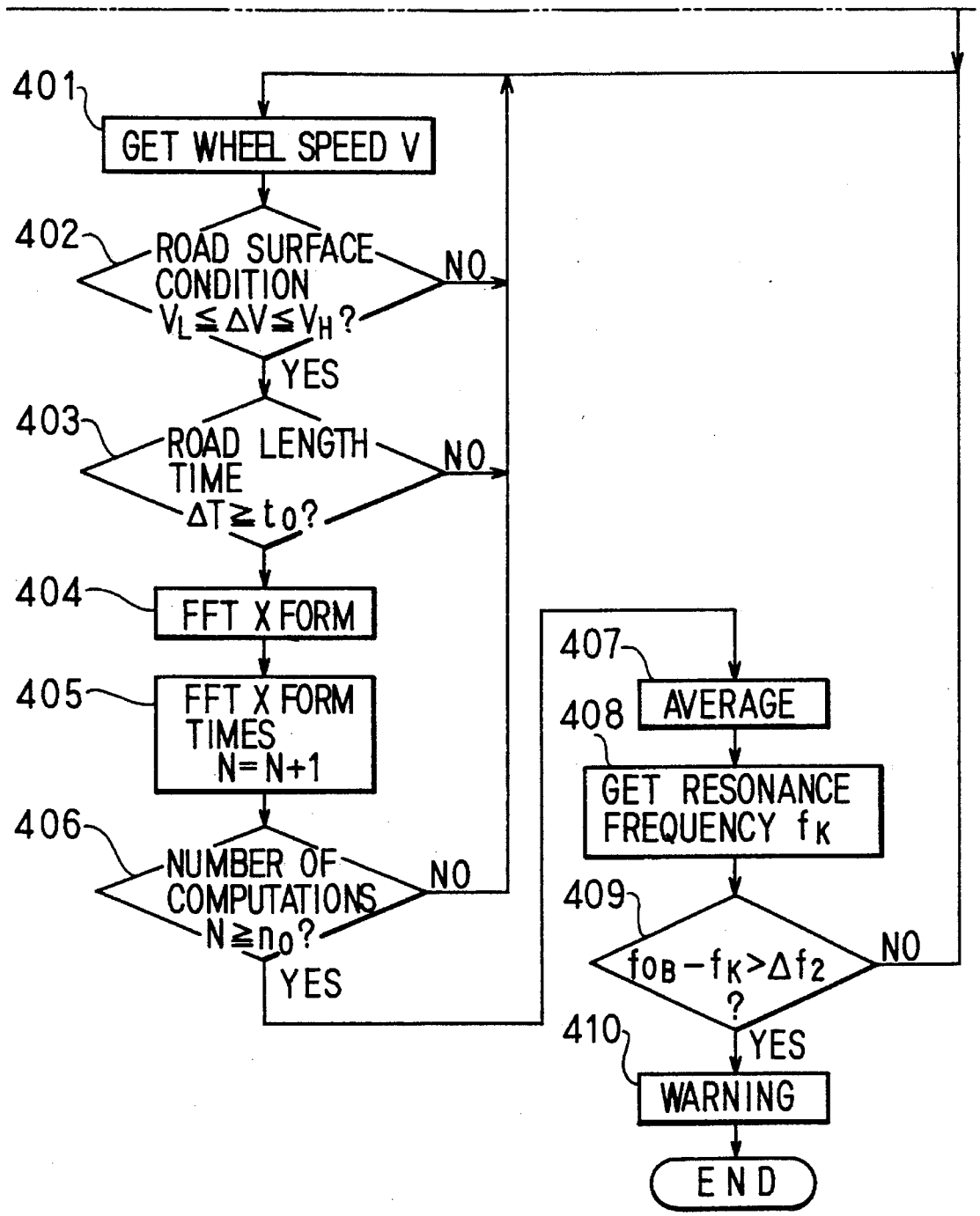

Step 409 of FIG. 9B checks if resonance frequency $f_k$ computed in step 408 for the resonance frequency (predetermined frequency) $f_{OB}$ is within a predetermined range Δf2 and if it is not, step 410 warns of the decline of pneumatic pressure. It must be noted here that the first tire replacement is not yet executed and if the standard tire is presently installed, the predetermined frequency $f_{OA}$ is checked to see if it is within predetermined range Δf2. In addition, step 409 performs tire replacement, and critical frequency which is compared with Δf2 is renewed in a $f_{LA} \rightarrow f_{LB} \rightarrow f_{LC}$ . . . sequence after the end of each cycle after switching on update switch 41.

This embodiment gives the same effect as that of the first embodiment with no need for calculating the critical frequency $f_{LB}$. Also, it is possible for this embodiment to warn on the oversupply of tire pneumatic pressure.

Figure 10A:
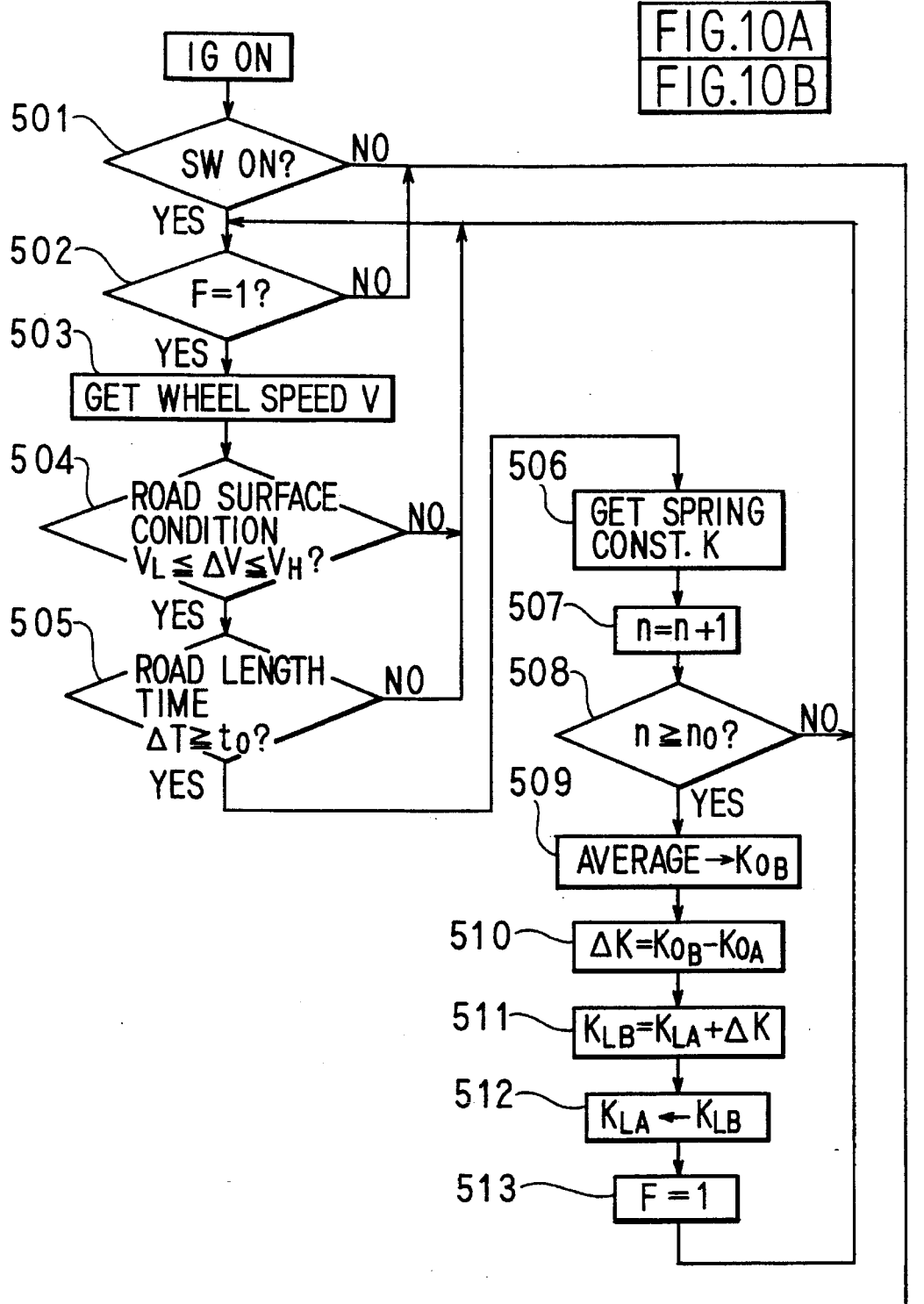
FIGS. 10A and 10B are a flowchart of the processing procedure of a electronic control unit according to a third embodiment of the present invention.
Figure 10B:
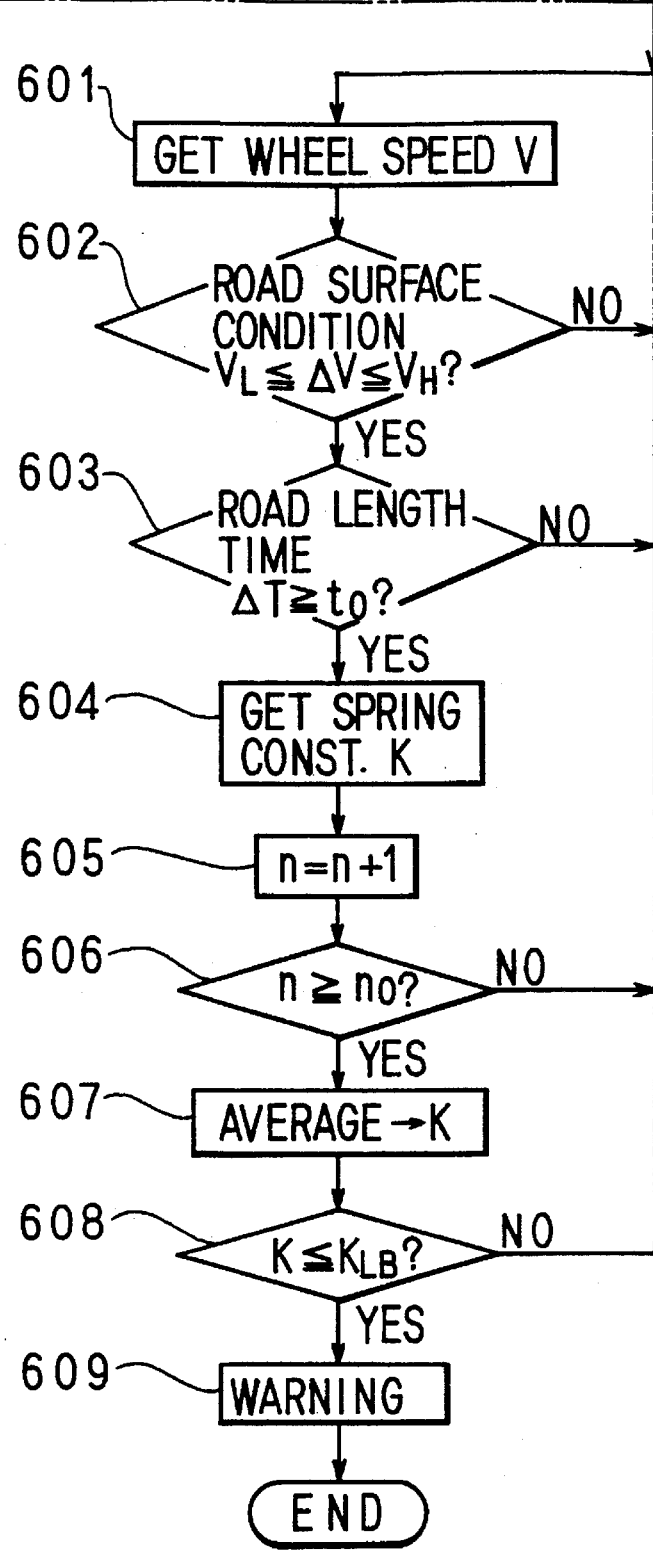

While the resonance frequency is extracted in the above embodiments, the spring constant of the tire can also be computed. The process for this case is shown in FIGS. 10A and 10B which are basically the same as the processes of the first embodiment shown in FIGS. 2A and 2B. Their differences are explained below.

Step 506 of FIG. 10A computes spring constant K using the method disclosed in Japanese Patent Laid Open Publication Hei-5-119607 (incorporated herein by reference). Steps 507 and 508 compute this spring constant K $n_O$ times. Step 509 performs an averaging procedure to derive the final value of the predetermined spring constant (the spring constant of the tire at the predetermined pneumatic pressure) $K_{OB}$ of the replacement tire. Step 510 computes the difference $\Delta K$ between predetermined spring constant $K_{OB}$ and predetermined spring constant $K_{OA}$ of the standard tire. Next, step 511 computes the critical spring constant (the spring constant of the tire at critical pneumatic pressure) $K_{LB}$ Of the replacement tire using Eq. (4). Step 512 then updates the critical spring constant $K_{LA}$ Of the standard tire to the above critical spring constant.

$$K_{LB}=K_{LA}+\Delta K \tag{4}$$

The computation of spring constant K is performed for $n_O$ times in steps 604, 605 and 606 of FIG. 10B. Step 607 executes an averaging procedure to derive the present spring constant K of the replacement tire. Next, step 608 compares the above spring constant K with a critical spring constant $K_{LB}$, and if the former is smaller than the latter, step 609 generates a pneumatic pressure decline warning.

Figure 11:
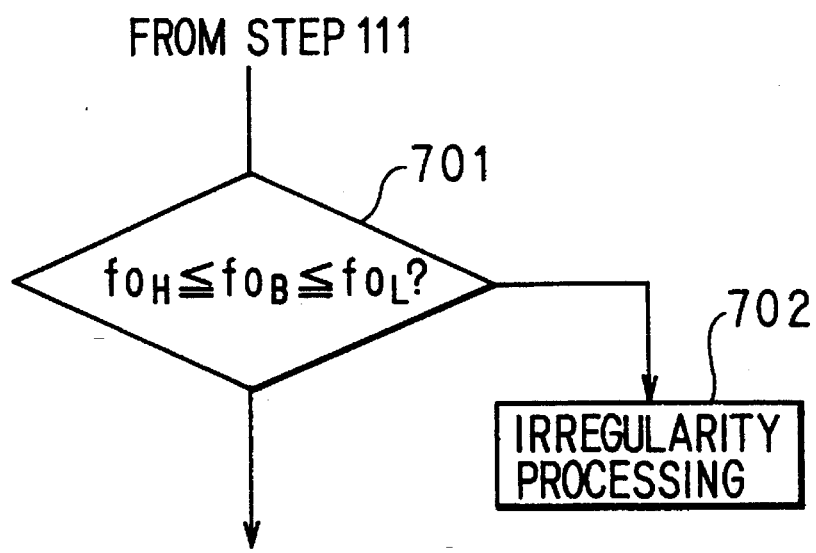
FIG. 11 is a flowchart of the principal part of the processing procedure of an electronic control unit according to a fourth embodiment of the present invention.

For the process shown in FIG. 2A of the first embodiment, irregularity determination step 701 shown in FIG. 11 is inserted between steps 110 and 111. With the provision of this step 701, irregularity processing proceeds from step 701 to step 702 without updating the critical frequency in step 111 if the resonance frequency $f_{OB}$ computed in step 110 is not within the normal range $f_{OL}$-$f_{OH}$ (shown in FIG. 12). This irregularity procedure involves cancelling the above resonance frequency $f_{OB}$, prohibiting the change of the standard value, retraining, showing warnings or the like.

It must be noted here that irregularity determination step 702 can be inserted between steps 509 and 510 shown in FIG. 10A of the third embodiment to eliminate a spring constant $K_{OB}$ that is not within the predetermined range.

While a range of values for the magnitude of the resonance frequency is provided in step 801 described above, a range can also be provided, for example, for the magnitude of difference $\Delta f$ computed in step 111 of FIG. 2A of the first embodiment and irregularity processing can be executed if $\Delta f$ deviates from such a range.

Furthermore, while the above irregularity processing deals with prohibiting changes in the critical frequency, in other words, with the prohibition of changing the standard value or the like, there is no need to be limited to this technique. For example, in step 209 shown in FIG. 2B, the execution of the comparison procedure of the resonance frequency with the critical frequency can be prohibited with the prediction of tire pneumatic pressure also prohibited. Also, the display of warnings in step 210 of FIG. 2B can be prohibited. Even with this, passengers can still be informed accurately of the decline in the pneumatic pressure.

In the above embodiments, the critical frequency after tire replacement is changed based on the frequency (predetermined frequency) of the tire having the predetermined pressure and the critical frequency which corresponds to the critical pneumatic pressure of the tire. However, in this fifth embodiment, the slope of the substantially linear relationship between the resonance frequency and the tire pneumatic pressure that is fixed for each vehicle type is stored beforehand. Then, after tire replacement, this slope is used in adjusting the setting of the critical frequency of the new tire. In this fifth embodiment, there is no specification on standard tires with the critical frequency computed for every installed tire after each tire replacement, and tire pneumatic pressure detection is executed based on this critical frequency. For this case, it is assumed that, the tire is pumped to have the predetermined pneumatic pressure immediately after tire replacement.

Figure 13:
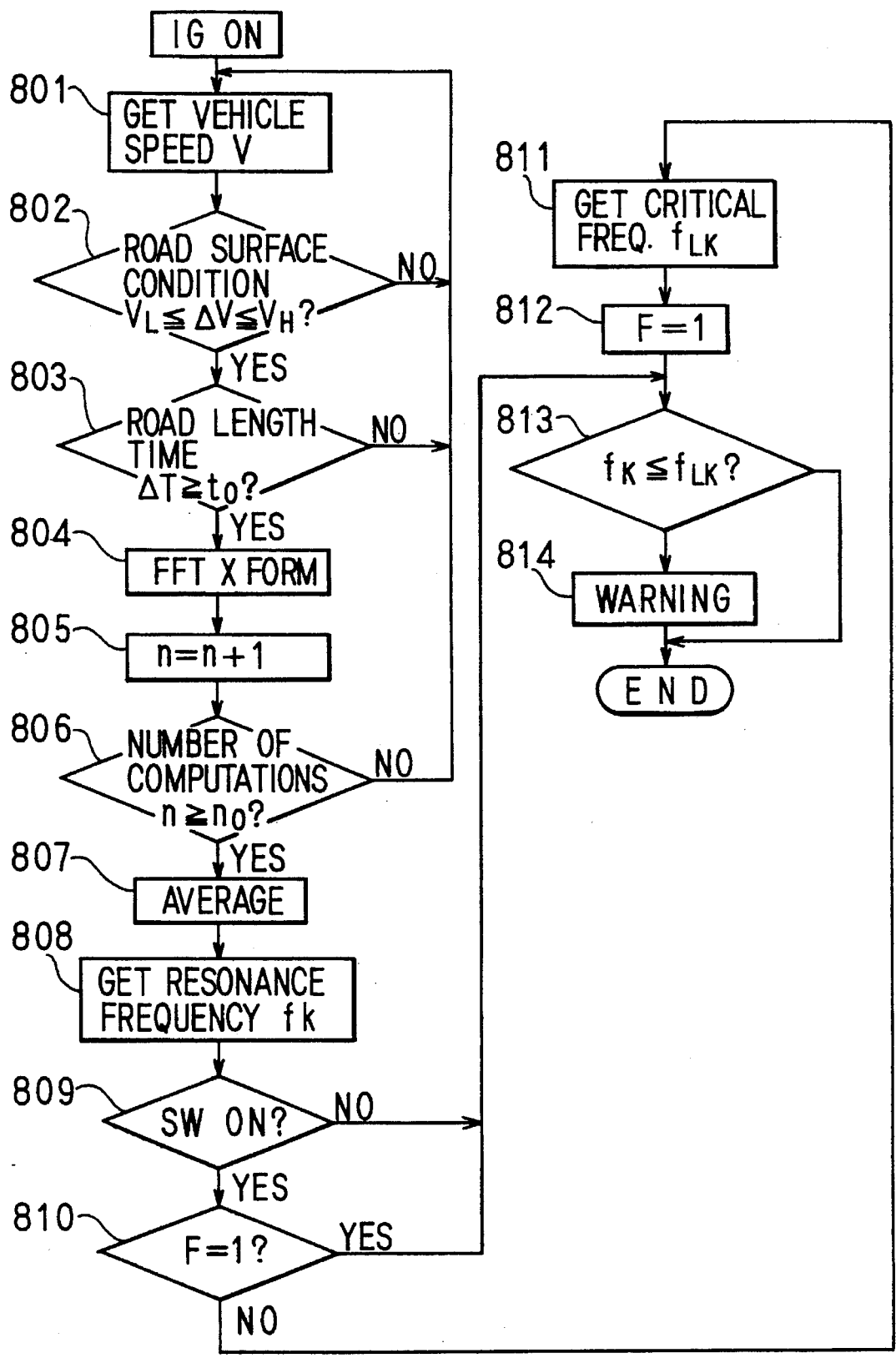
FIG. 13 is a flowchart showing the processing procedure of an electronic control unit according to a fifth embodiment of the present invention.

FIG. 13 is used in explaining the fifth embodiment. While switching on the ignition switch starts the processing from step 801, explanation thereof is omitted since the flow up to and including step 808 is practically the same as that of the embodiments described before. Step 809 determines if update switch 41 is on. If so, control proceeds to step 810. Usually, update switch 41 is off and accordingly, control proceeds to step 813. Also, it must be noted here that when driving vehicles after shipment from the factory, update switch 41 is set to be on beforehand and so control proceeds to step 810.

First, the process when tire replacement is executed or during driving after factory shipment is explained. For this case, update switch 41 is on and control proceeds to step 810 where the flag is checked. This flag is not set during driving after factory shipment and since this flag is reset when ignition is turned off temporarily due to the replacement of the tire, control proceeds to step 811. Step 811 computes the critical frequency $f_{LK}$ using the slope of the relationship between frequency and tire pneumatic pressure which is stored beforehand for each car type in ECU 4 or the like and resonance frequency $f_k$ computed in step 808. Since the predetermined frequency value and critical pneumatic frequency value when the tire has the predetermined pneumatic pressure value, and the slope values that express the relationship of these frequencies with the tire pneumatic pressure are used during the computation of critical frequency $f_{LK}$, critical frequency $f_{LK}$ can be computed accurately. It must be noted here that the resonance frequency $f_k$ computed after factory shipment or resonance frequency computed at the start of tire replacement is used as the predetermined frequency.

Step 812 sets flag F. Next, proceeding to step 813, critical frequency $f_{LK}$ and resonance frequency $f_k$ are compared and step 814 generates warnings according to the comparison result.

While control passes through steps 811 and 812 when tire replacement is executed or during driving after factory shipment, processing skips steps 811 and 812 when update switch 41 is off when there is no tire replacement or the like, or when control has once passed through steps 811 and 812 even if the update switch 41 is on after ignition. In other words, since step 809 gives a negative result if update switch 41 is not actuated, then control proceeds from step 809 to step 813. It must be noted here that this update switch 41 resets if the ignition is turned off.

In this way, there is no need to specify standard tires for this fifth embodiment and only the slope which expresses the relationship between resonance frequency and tire pneumatic pressure needs to be stored for each vehicle type for the simple and accurate detection of pneumatic pressure for each tire.

It must be noted here that the irregularity determination step 701 explained in the fourth embodiment can also be inserted between steps 811 and 812 or the like for this fifth embodiment. That is, if the flow of the process has advanced to step 811, the update switch 41 is on during vehicle driving or tire replacement and for this case, it is assumed that the presently-installed tire has the predetermined pneumatic pressure. However, if the resonance frequency $f_k$ is not within the predetermined range, it is determined that the resonance frequency cannot be detected accurately and measures such as prohibiting tire pneumatic pressure detection are taken by the irregularity processing routine 702. Accordingly, erroneous information on the irregularity of the tire pneumatic pressure can be avoided.

While the slope is used in computing the critical frequency for the fifth embodiment, there is no specification for the standard tire, no storing of the predetermined frequency and critical frequency for the standard tire, and no employment of these in the control process. In a sixth embodiment of the invention, critical frequency is computed using such slope and the predetermined frequency for the standard tire is stored and is used for control.

The flow of control is explained simply below. The same process as that of steps 101 to 111 of FIG. 2A for the first embodiment is performed and in the same way as step 811 of FIG. 13 of the fourth embodiment, step 112 computes the critical frequency of the present tire using the slope described above and the predetermined frequency when the presently-installed tire has the predetermined pneumatic pressure. Next, step 113 updates the critical frequency. In the same way as the first embodiment, steps starting from step 201 are executed when update switch 41 is not actuated and when the update switch 41 is continuously actuated after updating the critical frequency. It must be noted here that the critical frequency for the standard tire can be stored beforehand in ECU 4 or computed from the stored slope and predetermined pneumatic pressure.

Next, a step which has the same effect as Step 701 of the fourth embodiment is inserted between steps 111 and 113 shown in FIG. 2A. For example, if it is inserted after step 111, the step determines if the deviation $\Delta f1$ between the value of the predetermined frequency of the standard tire and the predetermined frequency of the presently installed tire lies in the range from $\Delta f_l$ to $\Delta f_h$. That is, if deviation $\Delta f1$ is too large, then it is assumed that the resonance frequency of the presently installed tire cannot be detected correctly for some reason and control proceeds to the next step where irregularity processing is executed. The same irregularity processing as that of the fourth embodiment described before may be performed.

In this way, fixing the predetermined frequency for the standard tire enables the determination of irregularity after tire replacement with the predetermined frequency of the standard tire as the standard and the execution of accurate irregularity detection.

Although the present invention has been fully described in connection with preferred embodiments thereof with reference to accompanying drawings, it is to be noted that various changes and modifications will become apparent to those skilled in the art. Such changes and modifications are to be understood as being within the scope of the present invention as defined by the appended claims.

What is claimed is:

1. A tire pneumatic pressure detector comprising:

cruising signal generation means for generating a cruising signal during cruising of a vehicle, said cruising signal including vibration frequency components of a tire installed on said vehicle;

extraction means for extracting an extracted characteristic from said cruising signal, said extracted characteristic being one of a resonance frequency of said tire and a spring constant of said tire;

tire pneumatic pressure prediction means for predicting tire pneumatic pressure based on said extracted characteristic;

signal generation means for generating predetermined signals when said tire is replaced with a tire having a predetermined pneumatic pressure;

memory means for storing, for a plurality of vehicle types, data representative of a substantially linear relationship of a change in said extracted characteristic with a change in said tire pneumatic pressure;

computation means for, responsive to said predetermined signal, computing a critical characteristic corresponding to a critical pneumatic pressure of a presently installed tire based on said relationship stored in said memory means and said extracted characteristic, said critical characteristic being one of a critical resonance frequency and a critical spring constant; and determination means for determining tire pneumatic pressure based on said critical characteristic.

2. A tire pneumatic pressure detector comprising:

cruising signal generation means for generating a cruising signal during cruising of a vehicle, said cruising signal including vibration frequency components of a tire installed on said vehicle;

extraction means for extracting an extracted characteristic of said tire from said cruising signal, said extracted characteristic being one of a resonance frequency of said tire and a spring constant of said tire;

memory means for storing a critical characteristic corresponding to a critical pneumatic pressure which is a standard for determining abnormal tire pneumatic pressure in a predetermined standard vehicle tire, and for storing a standard characteristic indicative of when said standard vehicle tire has a predetermined pneumatic pressure, said critical characteristic being one of a critical resonance frequency and a critical spring constant and said standard characteristic being one of a standard resonance frequency and a standard spring constant;

signal generation means for generating a predetermined signal when said standard vehicle tire is replaced with a vehicle tire having said predetermined pneumatic pressure;

computation means for, responsive to said predetermined signal, computing a deviation between said standard characteristic and said extracted characteristic; and alteration means for altering said critical characteristic based on said deviation;

tire pneumatic pressure prediction means for predicting tire pneumatic pressure based on said extracted characteristic.

3. The tire pneumatic pressure detector of claim 2, said tire pneumatic pressure detector further comprising:

conformity determination means for, responsive to said predetermined signal, determining whether said extracted characteristic lies within a predetermined range, said predetermined range being one of a range of resonance frequencies of said tire and a range of spring constants of said tire; and prohibition means for prohibiting said alteration means from altering said critical characteristic when said conformity determination means determines that said deviation does not lie within said predetermined range.

4. The tire pneumatic pressure detector of claim 2, said tire pneumatic pressure detector further comprising:

conformity determination means for determining whether said deviation lies within a predetermined range; and prohibition means for prohibiting said alteration means from altering said critical characteristic when said conformity determination means determines that said deviation does not lie within said predetermined range.

5. The tire pneumatic pressure detector of claim 2, said tire pneumatic pressure detector further comprising:

conformity determination means for, responsive to said predetermined signal, determining whether said extracted characteristic lies within a predetermined range, said predetermined range being one of a range of resonance frequencies of said tire and a range of spring constants of said tire; and prohibition means for prohibiting said pneumatic pressure prediction means from predicting tire pneumatic pressure when said conformity determination means determines that said extracted characteristic does not lie within said predetermined range.

6. The tire pneumatic pressure detector of claim 2, said tire pneumatic pressure detector further comprising:

conformity determination means for determining whether said deviation lies within a predetermined range; and prohibition means for prohibiting said pneumatic pressure prediction means from predicting tire pneumatic pressure when said conformity determination means determines that said deviation does not lie within said predetermined range.

7. A tire pneumatic pressure detector comprising:

cruising signal generation means for generating a cruising signal during cruising of a vehicle, said cruising signal including vibration frequency components of a tire installed on said vehicle;

extraction means for extracting an extracted characteristic from said cruising signal, said extracted characteristic being one of a resonance frequency of said tire and a spring constant of said tire;

tire pneumatic pressure prediction means for predicting tire pneumatic pressure based on said extracted characteristic;

memory means for storing a standard characteristic of a predetermined standard tire indicative of when said tire has a predetermined pneumatic pressure, and for storing a critical characteristic corresponding to a critical tire pneumatic pressure which is a standard for determining an abnormality in a pneumatic pressure of said standard tire, said standard characteristic being one of a standard resonance frequency of said standard tire and a standard spring constant of said tire and said critical characteristic being one of a resonance frequency and a critical spring constant;

first determination means for determining an abnormality in tire pneumatic pressure of said standard tire based on said extracted characteristic and said critical characteristic stored in said memory means;

signal generation means for generating a predetermined signal when said standard tire is replaced with a tire having said predetermined pneumatic pressure;

computation means for computing, responsive to said predetermined signal, a relationship between said standard characteristic and said extracted characteristic;

alteration means for altering said critical characteristic based on said relationship; and second determination means for determining an abnormality in tire pneumatic pressure based on said extracted characteristic and said critical characteristic altered by said alteration means.

8. The tire pneumatic pressure detector of claim 7, wherein:

said computation means is for comparing a deviation between said standard characteristic and said extracted characteristic; and said alteration means computes a critical characteristic after tire replacement by adding said deviation to said critical characteristic.

9. The tire pneumatic pressure detector of claim 8, said tire pneumatic pressure detector further comprising:

conformity determination means for, responsive to said predetermined signal, determining whether said extracted characteristic lies within a predetermined range, said predetermined range being one of a range of resonance frequencies of said tire and a range of spring constants of said tire; and prohibition means for prohibiting said alteration means from altering said critical characteristic when said conformity determination means determines that said deviation does not lie within said predetermined range.

10. The tire pneumatic pressure detector of claim 8, said tire pneumatic pressure detector further comprising:

conformity determination means for determining whether said deviation lies within a predetermined range; and prohibition means for prohibiting said alteration means from altering said critical characteristic when said conformity determination means determines that said deviation does not lie within said predetermined range.

11. The tire pneumatic pressure detector of claim 8, said tire pneumatic pressure detector further comprising:

conformity determination means for, responsive to said predetermined signal, determining whether said extracted characteristic lies within a predetermined range, said predetermined range being one of a range of resonance frequencies of said tire and a range of spring constants of said tire; and prohibition means for prohibiting said pneumatic pressure prediction means from predicting tire pneumatic pressure when said conformity determination means determines that said extracted characteristic does not lie within said predetermined range.

12. The tire pneumatic pressure detector of claim 8, said tire pneumatic pressure detector further comprising:

conformity determination means for determining whether said deviation lies within a predetermined range; and prohibition means for prohibiting said pneumatic pressure prediction means from predicting tire pneumatic pressure when said conformity determination means determines that said deviation does not lie within said predetermined range.

13. The tire pneumatic pressure detector of claim 7, said pneumatic pressure detector further comprising:

abnormality warning means for generating an abnormality warning signal when at least one of said first determination means and said second determination means determines an abnormality in tire pneumatic pressure.

14. The tire pneumatic pressure detector of claim 13, said tire pneumatic pressure detector further comprising:

conformity determination means for, responsive to said predetermined signal, determining whether said extracted characteristic lies within a predetermined range, said predetermined range being one of a range of resonance frequencies of said tire and a range of spring constants of said tire; and prohibition means for preventing said abnormality warning means from operating when said conformity determination means determines that said extracted characteristic does not lie within said predetermined range.

15. The tire pneumatic pressure detector of claim 13, said tire pneumatic pressure detector further comprising:

conformity determination means for determining whether said deviation lies within a predetermined range; and prohibition means for preventing said abnormality warning means from operating when said conformity determination means determines that said deviation does not lie within said predetermined range.

16. The tire pneumatic pressure detector of claim 7, said signal generating means being a switch generating said predetermined signal.

17. A tire pneumatic pressure detector comprising:

cruising signal generation means for generating a cruising signal during cruising of a vehicle, said cruising signal including vibration frequency components of a tire installed on said vehicle;

extraction means for extracting an extracted characteristic from said cruising signal, said extracted characteristic being one of a resonance frequency of said tire and a tire spring constant of said tire;

tire pneumatic pressure prediction means for predicting tire pneumatic pressure based on said extracted characteristic;

memory means for storing a standard characteristic when said tire has a predetermined pneumatic pressure and for storing a critical characteristic corresponding to a critical tire pneumatic pressure which is a standard for determining abnormality in said pneumatic pressure of said standard tire, said standard characteristic being a one of a standard tire resonance frequency of said standard tire and a standard spring constant of said standard tire and said critical characteristic being one of a critical resonance frequency and a critical spring constant;

first determination means for determining an abnormality in tire pneumatic pressure of said standard tire based on said extracted characteristic and said standard characteristic stored in said memory means;

signal generation means for generating a predetermined signal when said standard tire is replaced with a tire having said predetermined pneumatic pressure;

computation means for, responsive to said predetermined signal, computing a relationship of a change in said extracted characteristic with standard tire pneumatic pressure as a slope based on said standard characteristic and said critical characteristic stored in said memory means responsive to said predetermined signal;

alteration means for computing a critical characteristic corresponding to a critical pneumatic pressure of a tire after replacement based on said slope computed by said computation means and said extracted characteristic after tire replacement; and second determination means for determining an abnormality in said tire pneumatic pressure based on said extracted characteristic and said critical characteristic altered by said alteration means.

18. A tire pneumatic pressure detector comprising:

cruising signal generation means which generates a cruising signal during cruising of a vehicle, said cruising signal including vibration frequency components of tires installed on said vehicle;

extraction means for extracting an extracted characteristic from said cruising signal, said extracted characteristic being one of a resonance frequency of said tire and a tire spring constant of said tire;

tire pneumatic pressure prediction means for predicting tire pneumatic pressure based on said extracted characteristic;

memory means for storing, for plurality of vehicle types, a slope indicative of a change in said extracted characteristic with tire pneumatic pressure;

signal generation means for generating a predetermined signal when said tire is replaced with a tire having a predetermined pneumatic pressure;

computation means for computing a critical characteristic for a critical pneumatic pressure of a presently installed tire based on said slope stored in said memory means and said extracted characteristic responsive to said predetermined signal, said critical characteristic being one of a critical resonance frequency and a critical spring constant; and determination means for determining tire pneumatic pressure based on said critical characteristic computed by said computation means.

19. The tire pneumatic pressure detector of claim 18, said determination means including:

comparison means for generating a comparison of said extracted characteristic and said critical characteristic; and abnormality warning means for generating an abnormality warning indicative of a state of insufficient pneumatic pressure when said comparison indicates that said extracted characteristic is less than or equal to said critical characteristic.

20. A tire pneumatic pressure detector comprising:

cruising signal generation means for generating a cruising signal during cruising of a vehicle, said cruising signal including vibration frequency components of a tire installed on said vehicle;

extraction means for extracting an extracted characteristic from said cruising signal, said extracted characteristic being one of a resonance frequency of said tire and a spring constant of said tire;

tire pneumatic pressure prediction means for predicting tire pneumatic pressure based on said extracted characteristic;

memory means for storing a standard characteristic of a predetermined standard tire indicative of when said tire has a predetermined pneumatic pressure and for storing a substantially linear slope indicative of a change in said standard characteristic with said pneumatic pressure of said standard tire, said standard characteristic being one of a standard resonance frequency of said standard tire and a standard spring constant of said standard tire;

first critical pneumatic pressure computation means for computing a critical characteristic corresponding to a critical pneumatic pressure of said standard tire based on said slope stored by said memory means, said critical characteristic being one of a critical resonance frequency and a critical spring constant;

first determination means for determining an abnormality in said tire pneumatic pressure based on said extracted characteristic and said critical characteristic;

signal generation means for generating a predetermined signal when said standard tire is replaced with a tire having said predetermined pneumatic pressure;

deviation computation means for, responsive to said predetermined signal, computing a deviation between said standard characteristic and said extracted characteristic;

alteration means for altering said critical characteristic based on said slope stored in said memory means;

second determination means for determining an abnormality in tire pneumatic pressure based on said extracted characteristic and said critical characteristic altered by said alteration means after said deviation computation means detects said predetermined signal;

conformity determination means for determining whether said deviation is within said predetermined range; and prohibition means for prohibiting said alteration means from altering said critical characteristic after said conformity determination means determines that said deviation is not within said predetermined range.

21. The tire pneumatic pressure detector of claim 20, wherein said alteration means computes said critical characteristic after tire replacement by adding said deviation to said critical characteristic.

22. A tire pneumatic pressure detector comprising:

cruising signal generation means for generating a cruising signal including vibration frequency components of a tire installed on a vehicle;

extraction means for extracting an extracted characteristic of said tire from said cruising signal, said extracted characteristic being one of a resonance frequency of said tire and a spring constant of said tire;

memory means for storing a critical characteristic corresponding to a critical pneumatic pressure which is a standard for determining pneumatic pressure abnormality in a predetermined standard tire, and a standard characteristic, said critical characteristic being one of a critical resonance frequency and a critical spring constant and said standard characteristic being one of a standard resonance frequency and standard spring constant extracted from said cruising signal when said standard tire has a predetermined pneumatic pressure;

signal generation means for generating a predetermined signal when said standard tire is replaced with a tire having said predetermined pneumatic pressure;

deviation computation means for computing a deviation between said standard characteristic and said extracted characteristic responsive to detection of said predetermined signal; and alteration means for altering said critical characteristic based on said deviation computed by said deviation computation means.

23. A system for detecting a tire pressure, said system comprising:

cruising signal generating means for generating an electrical cruising signal representative of movement of a vehicle on which said tire is installed;

characteristic extracting means for generating an electrical characteristic signal representative of a parameter characteristic of a suspension of said vehicle extracted from said cruising signal;

a memory storing data indicative of a relationship between said parameter and said tire pressure and generating electrical data signals representative of said data;

tire replacement signalling means for generating an electrical tire change signal representative of a replacement of said tire on said vehicle; and pressure determining means for generating an electrical pressure signal representative of said tire pressure based on said characteristic signal, said data signals and said tire change signal.

24. The system of claim 23, wherein said parameter is one of a resonance frequency of said tire and a spring constant of said tire.

25. The system of claim 23, further comprising:

critical value determining means for determining a critical value of said parameter based on a predetermined critical tire pressure; and warning generating means for comparing said tire pressure represented by said pressure signal to a range defined by said critical value and for generating a warning indicator when said tire pressure is outside said range.

26. The system of claim 23, wherein:

said data stored in said memory is indicative of a standard relationship between said parameter and said tire pressure for a standard tire; and said system further comprises adjusting means for adjusting said critical tire pressure based on a difference between a parameter in said standard relationship and said parameter represented by said characteristic signal.

27. The system of claim 26, wherein:

said pressure determining means is further for calculating a current relationship between said parameter and said tire pressure for said tire mounted on said vehicle based on said standard relationship, and for generating said electrical pressure signal based on said characteristic signal, said current relationship and said tire change signal; and said adjusting means is further for adjusting said current relationship according to said difference.

* * * * *